(12) United States Patent
Joseph

(10) Patent No.: US 6,931,424 B1
(45) Date of Patent: Aug. 16, 2005

(54) STORAGE EFFICIENT MINIMIZATION LOGIC

(75) Inventor: Brian Joseph, Tiburon, CA (US)

(73) Assignee: Alantro Communications, Inc., Santa Rosa, CA (US)

( * ) Notice: Subject to any disclaimer, the term of this patent is extended or adjusted under 35 U.S.C. 154(b) by 0 days.

(21) Appl. No.: 09/532,510

(22) Filed: Mar. 21, 2000

(51) Int. Cl.[7] .............................................. G06F 15/00
(52) U.S. Cl. ..................................... 708/207; 708/200
(58) Field of Search ............................... 707/100, 101, 707/102, 2; 340/146.2; 708/200, 207

(56) References Cited

U.S. PATENT DOCUMENTS

| | | | | |
|---|---|---|---|---|
| 4,100,532 A | * | 7/1978 | Farnbach | 382/106 |
| 4,821,290 A | * | 4/1989 | Hingorani et al. | 375/242 |
| 5,187,675 A | | 2/1993 | Dent et al. | |
| 5,383,142 A | * | 1/1995 | Chung | 708/212 |
| 5,455,825 A | * | 10/1995 | Lauer et al. | 370/413 |
| 5,710,562 A | * | 1/1998 | Gormish et al. | 341/107 |

OTHER PUBLICATIONS

Daneshgaran et al, "Efficient parallel pipelinable VLSI architecture for finding the maximum binary number", IEEE 1994, pp. 527-534.*

*Patent Abstracts of Japan*, Abstract of Japanese Patent "SORT PROCESSOR", Publication No. 04180124, Jun. 26, 1992, Japanese Application No. 02309365, Filed Nov. 15, 1990.

* cited by examiner

*Primary Examiner*—Uyen Le
(74) *Attorney, Agent, or Firm*—April M. Mosby; W. James Brady, III; Frederick J. Telecky, Jr.

(57) ABSTRACT

A system is provided for finding the result of a binary operation performed on an array of values, along with its address, in a storage-efficient manner. The system is based on a binary tree structure having a pipeline of binary operators and corresponding multiplexers and storage elements to store the outputs of the multiplexers in addition to the partial addresses of the outputs represented by the outputs of the binary operators. Each computation stage adds one more bit of address until the address is completely known at the last computation stage. The invention reduces the amount of storage required for keeping track of the addresses that are the result of the binary operation.

16 Claims, 3 Drawing Sheets

STORAGE EFFICIENT MINIMIZATION LOGIC

BACKGROUND OF THE INVENTION

The present invention relates to data processing techniques for use in communications systems and the like, and more particularly to the optimization of binary tree search structures used in such systems.

Determination of a minimum or maximum value in a set of data is a common operation which is often accomplished using specialized hardware. As an example, many communications systems utilize the Viterbi algorithm, which requires a determination of the most probable path for each state. This must be estimated by finding the path having the maximum metric (if correlation metric is used) or minimum metric (if Euclidean distance is used) among other concurrent paths. An efficient means for determination of the maximum or minimum metric is required.

A method for finding the minimum in an array of N values which is storage efficient is to store the running estimate of the minimum and its location and compare it to each of the (N−1) other values in the array. This method requires (N−1) comparisons which will take at least (N−1) clock cycles.

For delay sensitive systems or for systems having fewer than (N−1) clock cycles to do the comparisons, a standard alternate approach is the binary tree search structure. In a binary tree search structure, each layer contains half as many comparators and storage elements as the previous layer, thus reducing the latency to $\log_2 N$ clock cycles and allowing for pipelining. The downside of such a structure is the addition of (N−1) comparators and storage elements.

For the foregoing reasons, there is a need for a method and apparatus which limits the latency inherent in systems using a running estimate and which reduces the number of storage elements used in a standard binary tree search structure.

SUMMARY OF THE INVENTION

The present invention is directed at a method and apparatus for considerably reducing the storage needed in a binary tree search structure.

In a preferred embodiment, an array of values is searched to find the minimum using a binary tree search structure in a storage efficient manner. A plurality of decision units are grouped in a plurality of computation stages. The number of decision units in a computation stage at level i is equal to $N/2^i$, N being the size of the array. Each computation stage reduces by ½ the set of values likely to contain the minimum of the array. Each decision unit in a computation stage takes as its input a pair of data values plus partial addresses of each data value, stores the minimum of the two values and adds to its partial address one most significant bit indicating the local address of the selected data value within the pair of inputs. In this embodiment, each computation stage adds one more bit of address until the entire address is known.

In one embodiment of the present invention, a system for locating a specific value contained in an array of N data values is used. The specific value is the result of a binary operation defined over the array of N data values wherein each data value is W bits wide. The system comprises a plurality of decision units grouped in successive computation stages wherein each decision unit receives a pair of input values, each input value containing a data value and a partial address, and generates a value representative of a selected data value and the partial address of the selected data value. In this embodiment, the decision unit of the last computation stage contains the specific value.

In another embodiment, the present invention is related to an apparatus for obtaining information on a specific value within a pair of inputs, wherein each input contains a data value and a partial address of the data value, the apparatus comprising a binary operator which compares the data values and which generates as output a binary decision representative of a local address of the specific data value and a multiplexer which generates as output the specific data value along with its partial address based on the binary decision.

In yet another embodiment the present invention provides, in an array of N data values, a method of determining an address for a result. The result is the output of a binary operation defined in the array of data values, each data value having W bits. The method comprises the steps of performing, at each computation stage i of $\log_2 N$ computation stages, $N/2^i$ binary operations on the data values of $N/2^i$ pairs of input values. In this manner, each of the binary operations generates a binary decision representative of a local address of a selected data value within the pair of input values and multiplexes, at each computation stage, each pair of input values to produce an output determined by the binary decision.

It is an object of the present invention to provide a method for finding a specific value in an array of data values, the method comprising the steps of grouping a plurality of decision units in a plurality of computation stages wherein the number of decision units in a computation stage at level i is equal to $N/2^i$, N being the size of the array, and processing the data values in each decision unit. A decision unit at a last computation stage determines the specific value.

The present invention can be used in any array having a transitive binary operator defined on it wherein the binary operator maps any pair to the Boolean set of {true, false}.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description, serve to explain the principles of the invention.

DETAILED DESCRIPTION OF THE INVENTION

Figure 1:
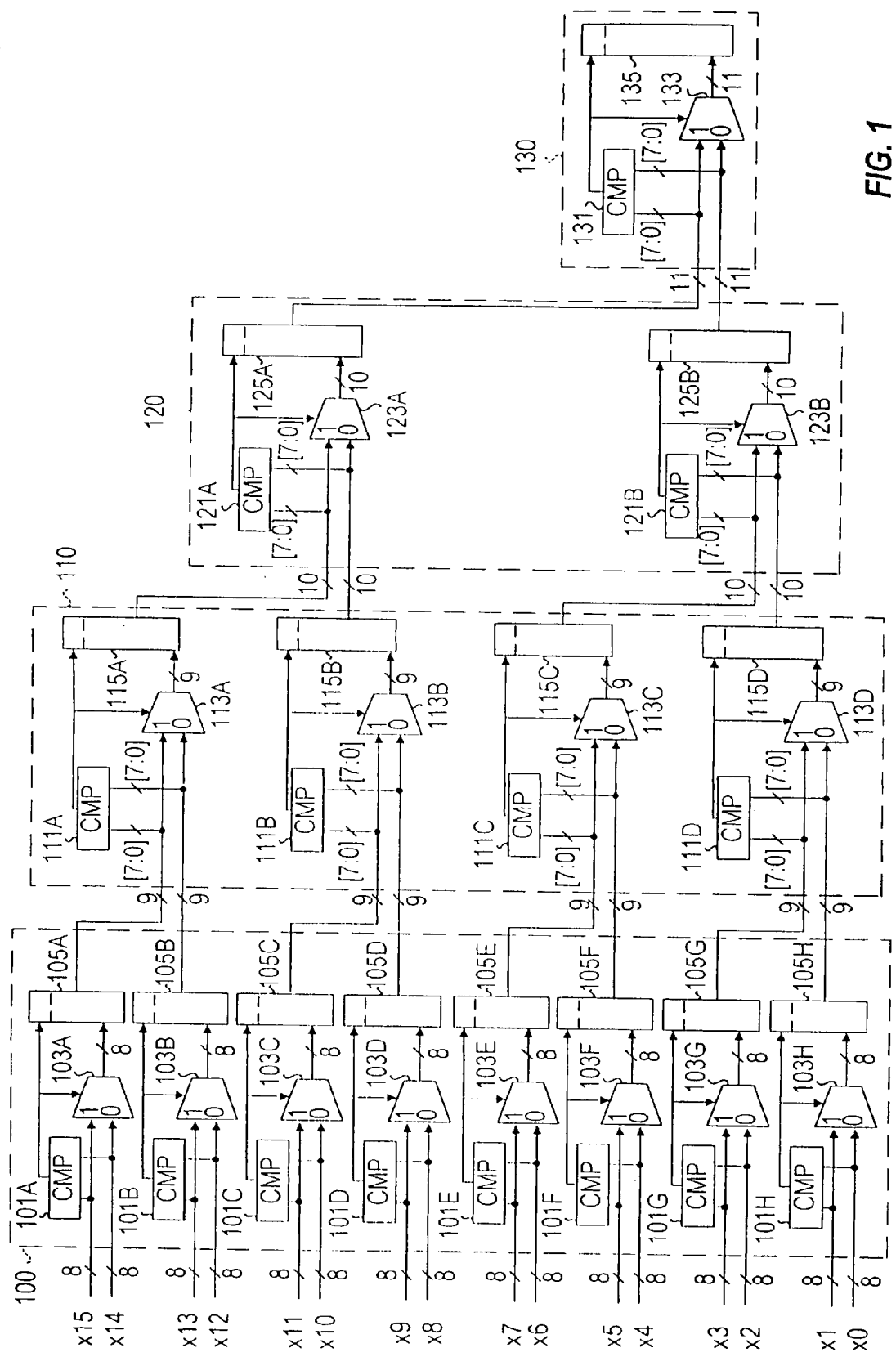
FIG. 1 shows a logic circuit for performing the method of the present invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Figure 2:
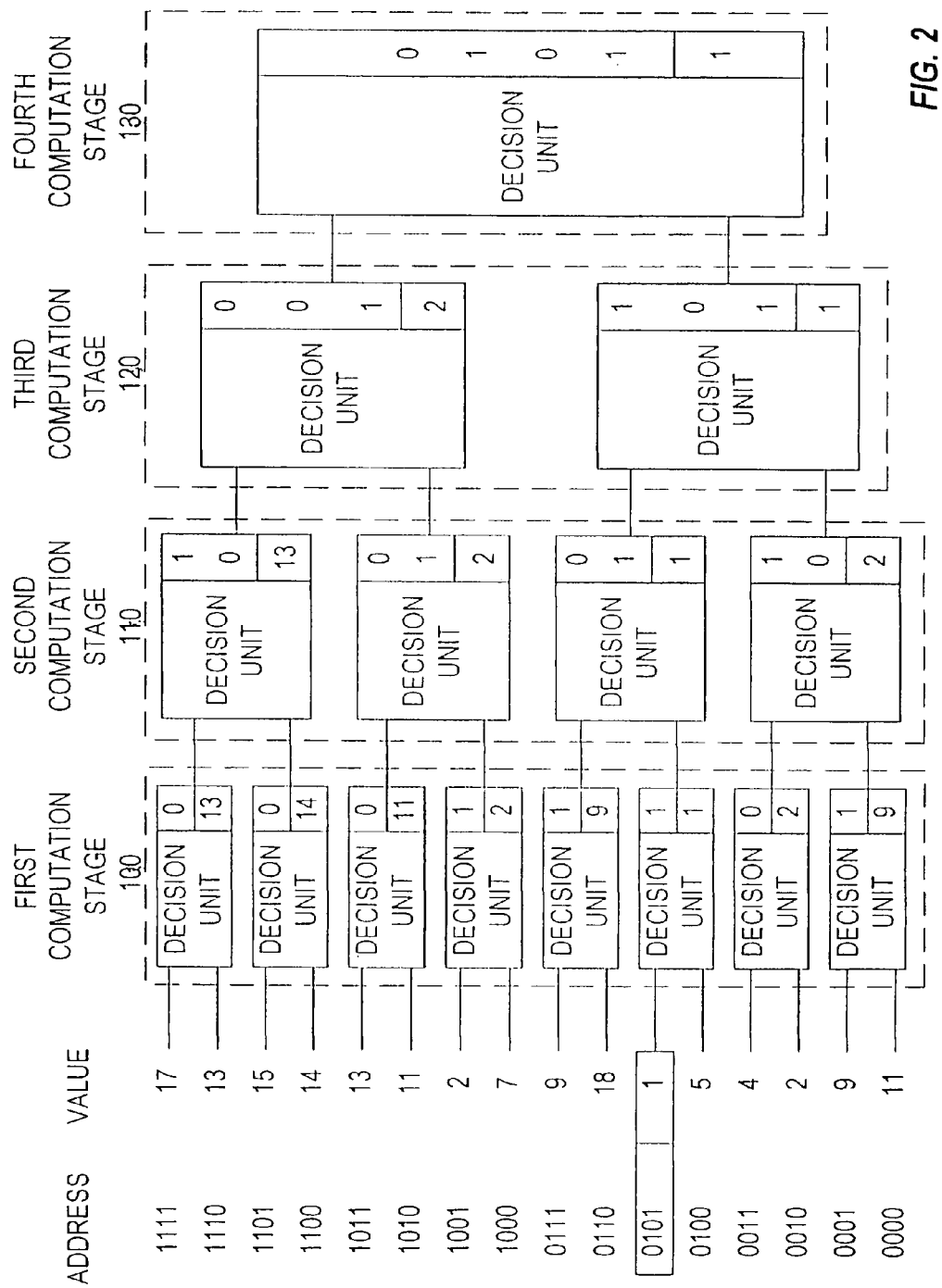
FIG. 2 shows the result obtained by applying the method of the present invention.
Figure 3:
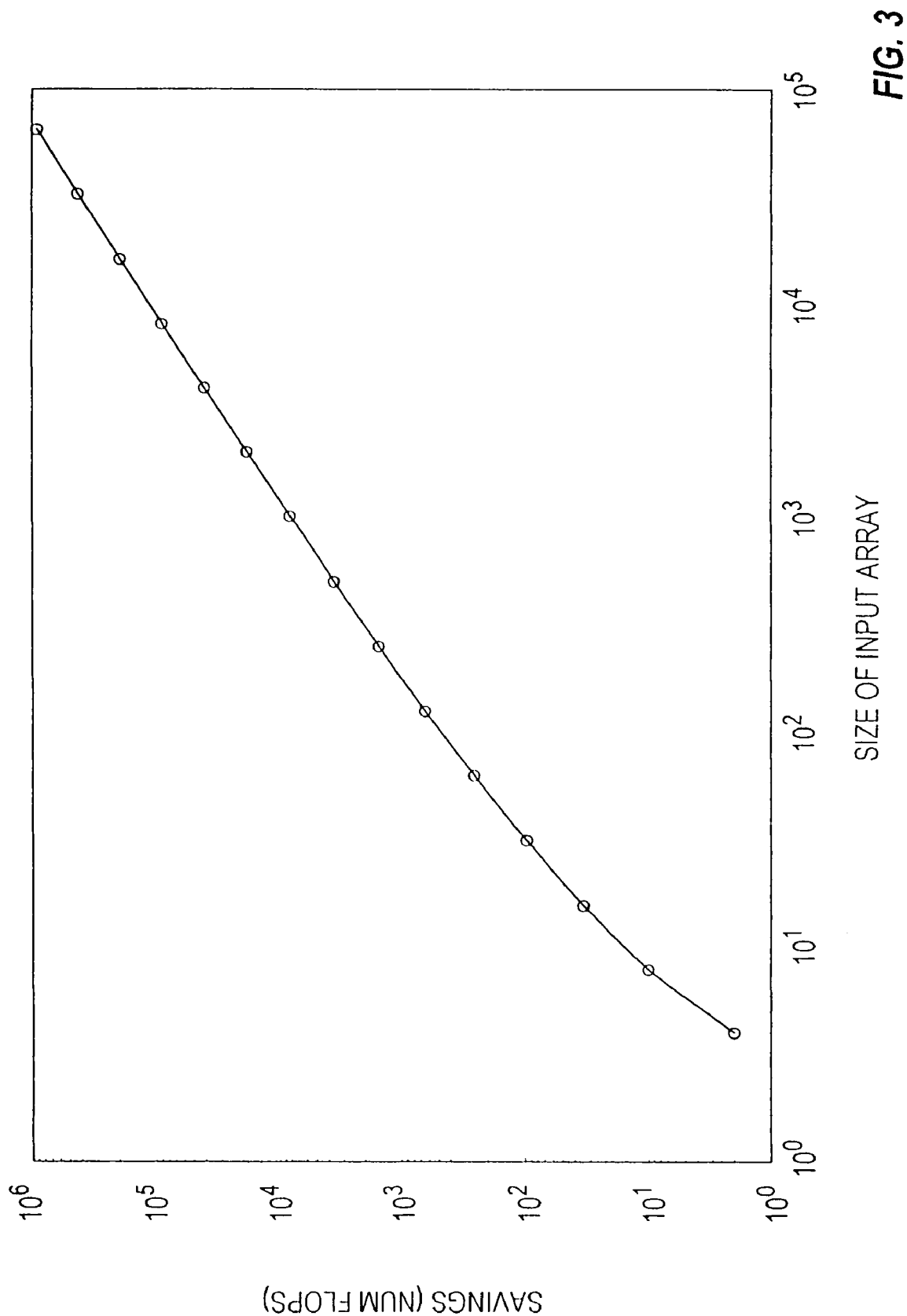
FIG. 3 shows memory savings obtained with respect to previous techniques when using the present method and apparatus.

With reference to the drawings in general and FIGS. 1 through 3 in particular, the apparatus of the present invention is disclosed.

FIG. 1 shows a logic circuit for performing the method of the present invention, and illustrates a circuit for obtaining the minimum value contained in an array of data values along with its location address. In this embodiment, sixteen data values X15, X14, . . . ,X0 contained in a memory area are searched to find the minimum value. Four computation stages, each having at least one decision unit, are used to determine the minimum and its location. Each computation stage prunes the number of possible values by one-half. In this embodiment, the possible values are the reduced set obtained from the array of data values by pruning half the values that are not the minimum values. The number of decision units at each stage is equal to one-half the number of input values.

In this embodiment, each decision unit in a computation stage takes as its input a pair of data values plus partial addresses of each data value, stores the minimum of the two input values and adds to its partial address one most significant bit indicating which of the two data values was picked. Each computation stage adds one more bit of address until the address is completely known.

As illustrated in FIG. 1, a decision unit is composed of a binary operator represented here as comparator 101, a multiplexer 103 and a storage element 105. Each comparator 101 at computation stage 100 takes as its input a pair of data values each eight bits long and outputs a binary decision representing the local address of the minimum data value within the pair. As an example, if X15 is the minimum compared to X14, the binary decision will be a binary 1 since "1" is the local address of X15 and "0" is the local address of X14 within the pair.

A multiplexer 103 at first computation stage 100 takes as its input a pair of values from the array of data values and outputs the input value selected by the binary decision. In this embodiment, the binary decision designates which input value corresponds to the Boolean "true" of the binary operator, and thus to the minimum of the two input values. A storage element 105 at first computation stage 100 stores the output of its associated multiplexer 103.

In one embodiment, the storage element 105 stores the selected data value in one section of memory storage and adds a local address bit represented by the binary decision as its most significant bit to the partial address of the selected data value. Alternatively, the local address can be added as the least significant bit of storage element 105 and the selected data value can be the eight most significant bits.

In this embodiment, at first computation stage 100, the partial addresses of the data values are 0 bits wide. At first computation stage 100, each storage element 105 contains a selected data value and one bit representing the partial address of the selected data value. The set of data values contained in all storage elements of first computation stage 100 represents the reduced set of data values which are likely to contain the minimum of the array of data values. The minimum value of the array of data values is also referred to as a specific value according to the binary operation defined over the array of data values.

At second computation stage 110, each multiplexer 113 takes as its input the content of a pair of storage elements 105 of first computation stage 100. As an example, the inputs of multiplexer 113a are the content of storage element 105a and 105b. In a preferred embodiment, the inputs of a decision unit are the two consecutive storage elements' contents of the previous computation stage. The inputs of the multiplexer 113 are each nine bits wide and represent an eight bit wide selected value plus one bit of partial address. In a preferred embodiment, the comparator 111 compares only the eight least significant bits of the input values to determine the minimum and outputs a binary decision. Storage element 115 stores the output of multiplexer 113 selected by the binary decision and adds the binary decision as the most significant bit to the partial address. At second computation stage 110, the possible values are reduced to a set of four elements.

The operation previously described in accordance with first computation stage 100 and second computation stage 110 is performed at each subsequent computation stage. At third computation stage 120, the decision units' inputs are ten bits wide while at fourth computation stage 130 they are eleven bits wide. The last stage, represented by fourth computation stage 130, contains only one decision unit, as illustrated in FIG. 1. The storage element 135 contains four bits representing the entire address of the specific value which is stored in the eight least significant bits portion of the storage element 135.

FIG. 2 illustrates the result obtained by applying the method of the present invention to an array of values. At each computation stage, the content of the storage elements is shown. The last computation stage contains the minimum value which is equal to one and its entire address which in binary format is 0101.

Although FIG. 1 shows an array of values of size sixteen, the present invention can be applied to any array of values having a size N wherein N is a power of two and each value is W bits wide. The number of computation stages in this case is equal to $\log_2 N$. Each computation stage at level i, with $1 \leq i \leq \log_2 N$, contains $N/2^i$ decision units and each decision unit takes two inputs, each (W+i−1)-bit wide.

The method of the present invention can also be applied to any set which has a binary operation defined on it and wherein the binary operation has a transitive property. In particular, the method can also be used to find a maximum in an array of values.

The curve of FIG. 3 shows the number of storage elements saved over the prior art when using the method and apparatus of the present invention. In the prior art binary tree search structure, the values along with their entire address are stored at each stage of the search, whereas with the present method only partial addresses are stored. The number of bit storage elements (NUM FLOPS) needed in the prior system is represented by the following formula: $W(N-1)+\log_2 N(N-1)$. The number of bit storage elements needed for the present system is equal to $W(N-1)+2N-\log_2 N-2$. The overall storage savings can then be predicted by the formula: $N\log_2 N-2N+2$ which is represented by the curve of FIG. 3.

Although the invention has been illustrated by reference to specific embodiments, it will be apparent to those skilled in the art that various adaptations and modifications may be made which clearly fall within the scope of the invention. The invention is intended to be protected broadly within the spirit and scope of the appended claims.

What is claimed is:

1. A system for locating a specific value contained in an array of N data values, the specific value being the result of a binary operation defined over the array of N data values wherein each data value is a plurality of bits wide, the system comprising a plurality of decision units grouped in successive computation stages wherein:

(a) each decision unit receives a pair of input values, each input value containing a data value and a partial address; and (b) each decision unit generates a value representative of a selected data value and the partial address of the selected data value and the decision unit of the last computation stage contains the specific value, wherein each of the plurality of decision units comprises:

(i) a binary operator for generating a binary decision representative of a local address of the selected data value, (ii) a multiplexer coupled to the binary operator for generating one of the pair of input values as output and with the output being selected by the binary decision, and (iii) a storage element coupled to the binary operator and the multiplexer for storing the output of the multiplexer and the binary decision which is added to the partial address of the selected data value.

2. The system of claim 1, wherein the binary operator selects the minimum value of the pair of data values contained in the pair of input values.

3. The system of claim 1, wherein the binary operator selects the maximum value of the pair of data values contained in the pair of input values.

4. The system of claim 1, wherein the partial address of an input value at computation stage i is the (i−1) most significant bit of the storage element of computation stage (i−1).

5. The system of claim 1, wherein the partial address of an input value at computation stage i is the (i−1) least significant bit of the storage element of computation stage (i−1).

6. The system of claim 1 wherein the number of computation stages K is related to the size N of the array of data values by the formula $K = \log_2 N$.

7. The system of claim 6 wherein the number of decision unites at a computation stage i is equal to N/2i and wherein $1 \leq i \leq K$.

8. The system of claim 6 wherein the last computation stage contains the address of the specific value in the K most significant bits of its associated storage element and the specific value is contained in the W least significant bits of said associated storage element.

9. The system of claim 6 wherein the last computation stage contains the address of the specific value in the K least significant bits of its associated storage element and the specific value is contained in the W most significant bits of said associated storage element.

10. An apparatus for obtaining information on a specific value within a pair of inputs, wherein each input contains a data value and a partial address of the data value, the apparatus comprising:

(a) a binary operator which compares the data values and which generates as output a binary decision representative of a local address of the specific data value;

(b) a multiplexer coupled to the binary operator and coupled to receive each data values along with its partial address which generates as output the specific data value along with its partial address based on the binary decision; and (c) a storage element coupled to the binary operator and the multiplexer which stores the output of the multiplexer and the binary decision.

11. The apparatus of claim 10 wherein the binary operator is a minimum operator.

12. The apparatus of claim 10 wherein the binary operator is a maximum operator.

13. In an array of N data values, a method of determining an address for a result, the result being the output of a binary operation defined in the array of data values each data value having W bits, the method comprising the steps of:

(a) performing, at each computation stage i of $\log_2 N$, computation stages, $N/2^i$ binary operations on the data values of $N/2^i$ pairs of input values using a binary operator, wherein each input value includes a data value and a partial address, wherein each of the binary operations generates a binary decision representative of a selected data value and the partial address of the selected data value;

(b) multiplexing at each computation stage each pair of input values using a multiplexer and producing an output determined by the binary decision; and (c) storing at each computation stage the binary decision and the selected data value in a storage element.

14. The method of claim 13 wherein the computation stage at level log2N contains the value of the result of the binary operation and its address within the array of values.

15. The method of claim 13 wherein the binary operation is minimum finding operation.

16. The method of claim 13 wherein the binary operation is a maximum finding operation.

* * * * *